US012573163B2

(12) United States Patent
Nishino

(10) Patent No.: US 12,573,163 B2
(45) Date of Patent: Mar. 10, 2026

(54) METHOD FOR MANUFACTURING PLATE-SHAPED THREE-DIMENSIONAL OBJECT

(71) Applicant: EPOCH COMPANY, LTD., Tokyo (JP)

(72) Inventor: Koichi Nishino, Tokyo (JP)

(73) Assignee: EPOCH COMPANY, LTD., Tokyo (JP)

( * ) Notice: Subject to any disclaimer, the term of this patent is extended or adjusted under 35 U.S.C. 154(b) by 365 days.

(21) Appl. No.: 18/368,249

(22) Filed: Sep. 14, 2023

(65) Prior Publication Data

US 2024/0161433 A1      May 16, 2024

(30) Foreign Application Priority Data

Nov. 15, 2022    (JP) ................................. 2022-182274

(51) Int. Cl.
  *G06T 19/20*          (2011.01)
  *B33Y 50/00*          (2015.01)
            (Continued)
(52) U.S. Cl.
  CPC .............. *G06T 19/20* (2013.01); *B33Y 50/00* (2014.12); *G05B 19/4099* (2013.01);
            (Continued)
(58) Field of Classification Search
  CPC . G06T 19/20; G06T 15/04; G06T 2219/2012; G06T 2219/2021;
            (Continued)

(56) References Cited

U.S. PATENT DOCUMENTS 6,677,944  B1 *    1/2004  Yamamoto .............. G06T 15/40
                                                          345/422
8,488,868  B2      7/2013  Tam et al.
            (Continued)

FOREIGN PATENT DOCUMENTS

DE      10 2017 119 023 A1    2/2019
JP          H11-296696 A      10/1999
            (Continued)

OTHER PUBLICATIONS

German Office Action issued Oct. 28, 2024 in Application No. 102023125057.4.

(Continued)

*Primary Examiner* — Chad G Erdman
(74) *Attorney, Agent, or Firm* — Faegre Drinker Biddle & Reath LLP

(57)          ABSTRACT

A method for manufacturing a plate-shaped three-dimensional object includes: preparing color image data including a colored three-dimensional pattern; and gray-scaling the color image data to obtain a grayscale image data. The method further includes: creating three-dimensional data based on a gradation of the grayscale image data; creating color three-dimensional data by performing texture mapping on the three-dimensional data using the color image data as a texture; and shaping the plate-shaped three-dimensional object by a full color 3D printer based on the color three-dimensional data.

3 Claims, 8 Drawing Sheets

(51) Int. Cl.
G05B 19/4099 (2006.01)
G06T 15/04 (2011.01)

(52) U.S. Cl.
CPC .... G06T 15/04 (2013.01); *G05B 2219/49023* (2013.01); *G06T 2219/2012* (2013.01); *G06T 2219/2021* (2013.01)

(58) Field of Classification Search
CPC ......... B33Y 50/00; B33Y 10/00; B33Y 30/00; B33Y 50/02; G05B 19/4099; G05B 2219/49023; B29C 64/386
See application file for complete search history.

(56) References Cited

U.S. PATENT DOCUMENTS

| | | | |
|---|---|---|---|
| 2008/0111816 A1 | 5/2008 | Abraham et al. | |
| 2016/0229222 A1* | 8/2016 | Stecker | B29C 64/386 |
| 2020/0055082 A1 | 2/2020 | Schlatterbeck et al. | |
| 2020/0103847 A1 | 4/2020 | Hatanaka | |
| 2020/0307105 A1 | 10/2020 | Inziello | |

FOREIGN PATENT DOCUMENTS

| | | |
|---|---|---|
| JP | 2010-510587 A | 4/2010 |
| JP | 2020-049852 A | 4/2020 |
| WO | WO-2008/061191 A2 | 5/2008 |
| WO | WO-2018/197531 A1 | 11/2018 |

OTHER PUBLICATIONS

Japanese Office Action dated Aug. 29, 2023, issued in corresponding Japanese Patent Application No. JP 2022-182274.

* cited by examiner

P1

P2

M1

M2

METHOD FOR MANUFACTURING PLATE-SHAPED THREE-DIMENSIONAL OBJECT

CROSS-REFERENCE TO RELATED APPLICATIONS

This application is based on and claims priority under 35 USC 119 from Japanese Patent Application No. 2022-182274 filed on Nov. 15, 2022, the contents of which are incorporated herein by reference.

TECHNICAL FIELD

The present disclosure relates to a method for manufacturing a plate-shaped three-dimensional object such as a diorama base.

BACKGROUND ART

In the related art, there has been provided a patterned plate-shaped three-dimensional object having a three-dimensional shape. Examples of such a plate-shaped three-dimensional object include a diorama base used in a diorama for displaying or appreciating a figure or the like in any scene. For the diorama base, in order to present a more realistic scene, a pattern having a three-dimensional shape with unevenness with a motif such as a lawn and a stone-paved alley is preferred rather than a flat pattern such as printing.

In the related art, a plate-shaped three-dimensional object such as a diorama base is produced by manually engraving a plate material. In recent years, it has become possible to use an NC machine tool and a 3D printer by creating (modeling) three-dimensional data using 3D-CAD or the like. Therefore, it is conceivable to create three-dimensional data for manufacturing a plate-shaped three-dimensional object based on a captured image or a planar image created by a drawing application. As this type of technique, JP2020-049852A discloses a three-dimensional data generation method for generating three-dimensional data of a predetermined region of a planar image by inputting a curve indicating a relationship between a distance from a contour of the predetermined region to each position and a height.

SUMMARY OF INVENTION

A plate-shaped three-dimensional object such as a diorama base is desired to be colored according to a purpose thereof. As a result, it may be necessary to paint a plate-shaped three-dimensional object created by an NC machine tool or a 3D printer. However, a lawn, a stone-paved alley, and the like require painting in slightly different shades rather than in a single color, and such painting may be troublesome and lead to a difficulty of manufacture of a colored plate-shaped three-dimensional object.

An object of the present disclosure is to provide a method for manufacturing a plate-shaped three-dimensional object, which enables a colored plate-shaped three-dimensional object to be easily manufactured.

The present disclosure provides a method for manufacturing a plate-shaped three-dimensional object, the method including: preparing color image data including a colored three-dimensional pattern; gray-scaling the color image data to obtain a grayscale image data; creating three-dimensional data based on a gradation of the grayscale image data; creating color three-dimensional data by performing texture mapping on the three-dimensional data using the color image data as a texture; and shaping the plate-shaped three-dimensional object by a full color 3D printer based on the color three-dimensional data.

According to the above aspect, it is possible to provide a method for manufacturing a plate-shaped three-dimensional object, which enables a colored plate-shaped three-dimensional object to be easily manufactured.

BRIEF DESCRIPTION OF DRAWINGS

The present disclosure will be described in detail based on the following figures, wherein.

DESCRIPTION OF EMBODIMENTS

Figure 1:
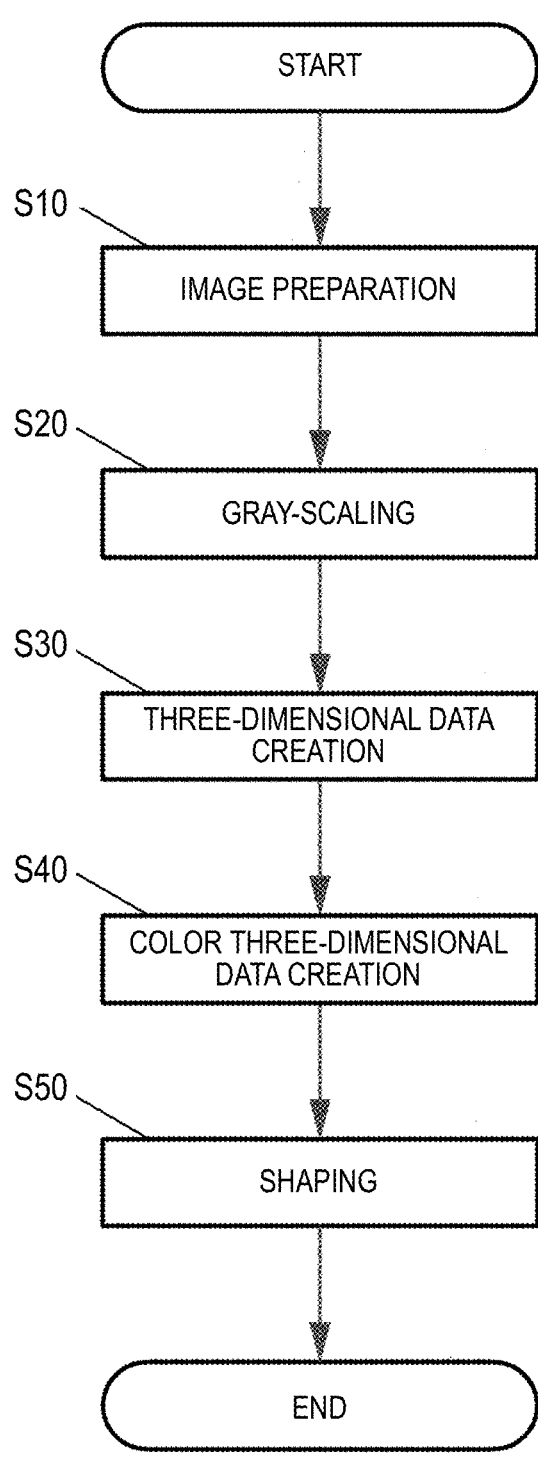
FIG. 1 is a flowchart showing a method for manufacturing a plate-shaped three-dimensional object according to an embodiment of the present disclosure.

Hereinafter, an embodiment of the present disclosure will be described with reference to the drawings. A plate-shaped three-dimensional object such as a diorama base is manufactured according to a flowchart in FIG. 1. Hereinafter, each step will be described based on the flowchart in FIG. 1.

Image Preparation Step (Step S10)

In an image preparation step (step S10), color image data to be a motif of the plate-shaped three-dimensional object to be manufactured is prepared. As the color image data, image data created by various methods such as captured image data obtained by capturing an image using an image-capturing apparatus such as a camera, image data created by drawing application software, and image data created by scanning a handwritten illustration can be used. Here, the color image data represents an image including a colored three-dimensional pattern. The colored three-dimensional pattern is a pattern having a colored three-dimensional shape, and includes artificial and/or natural objects.

Figure 2:
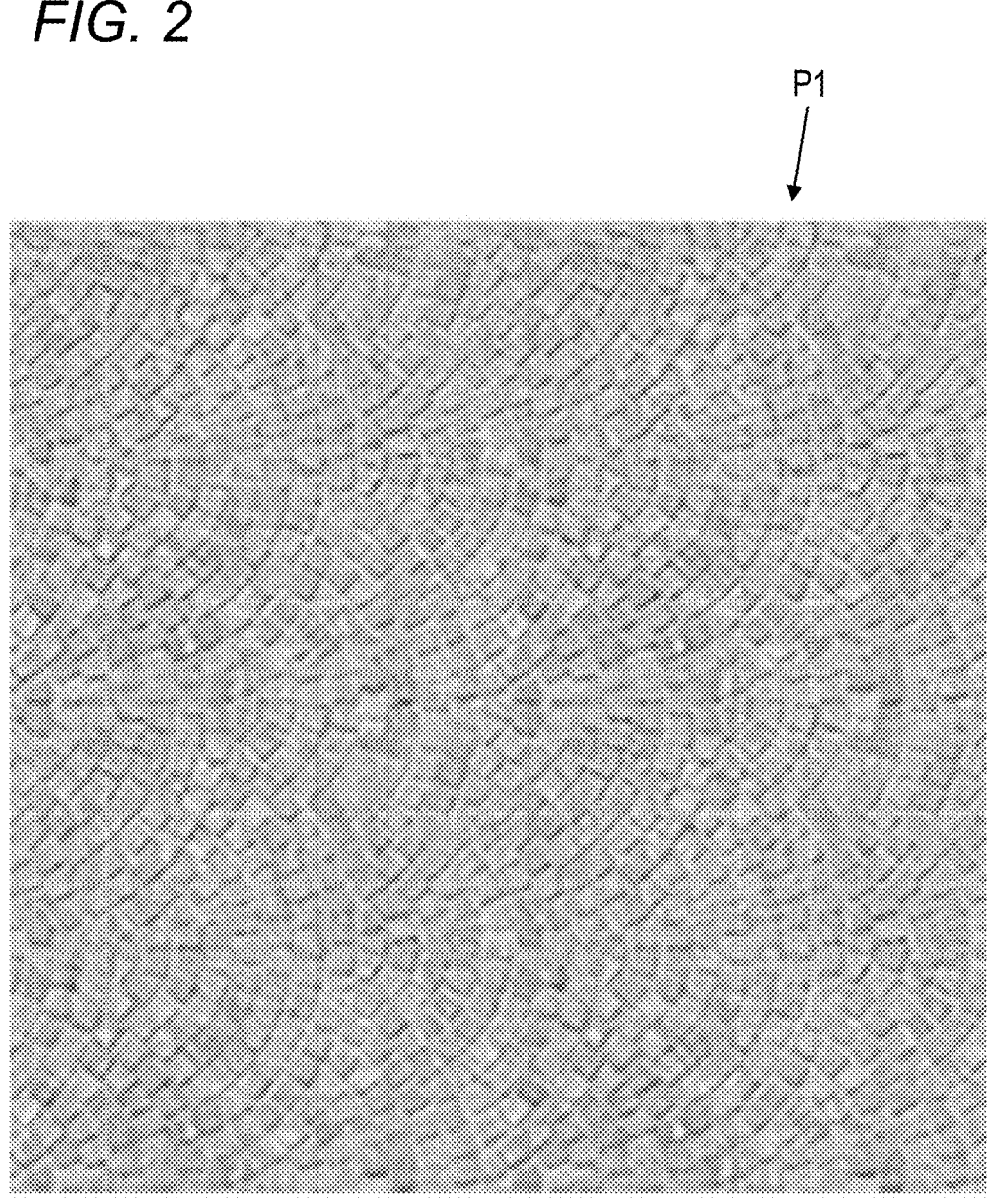
FIG. 2 is an example of an image prepared in an image preparation step in the method for manufacturing a plate-shaped three-dimensional object according to the embodiment of the present disclosure.

Color image data P1 in FIG. 2 is an example of the color image data prepared in the image preparation step (step S10), and includes a colored three-dimensional pattern created based on a captured image of a stone alley. Here, when the color image data is prepared by capturing an image, it is desirable to capture an image from a direction as perpendicular as possible to a plane (ground). This is because, if an image is captured obliquely with respect to the plane (ground), a plate-shaped three-dimensional object having an obliquely distorted pattern is manufactured.

If the color image data prepared in the image preparation step (step S10) is processed to a size in which an object can be manufactured by a full color 3D printer used in a subsequent shaping step (step S50), it is possible to omit an operation of adjusting the size in the subsequent step. The color image data P1 can be processed by application software for performing photo processing provided in a personal computer (PC). A plurality of the same plate-shaped three-dimensional objects may be manufactured and used by being arranged like tiles. In such a case, by performing the processing described below, it is possible to manufacture a plurality of plate-shaped three-dimensional objects that can be arranged with a more natural appearance.

The image preparation step (step S10) may include an image capturing step and a photo cutting step. In the image capturing step, an image of a patterned floor surface (ground) is captured. As described above, the image is captured from a direction perpendicular to the floor surface. In the photo cutting step, the color image data is created by cutting photo data captured in the image capturing step into a rectangular shape so as to form continuous patterns when arranged in a vertical direction and/or a horizontal direction. The color image data P1 in FIG. 2 is formed by cutting the photo data at a position without providing a feeling of strangeness such that stone-paved patterns arranged in a semicircular shape are substantially continuous when arranging a plurality of plate-shaped three-dimensional objects formed using the color image data P1 in the vertical direction and the horizontal direction. The color image data P1 is also formed in a rectangular shape such that the manufactured plate-shaped three-dimensional object has a rectangular shape. The color image data P1 can be processed by the application software for performing photo processing provided in the PC.

Gray-Scaling Step (Step S20)

Figure 3:
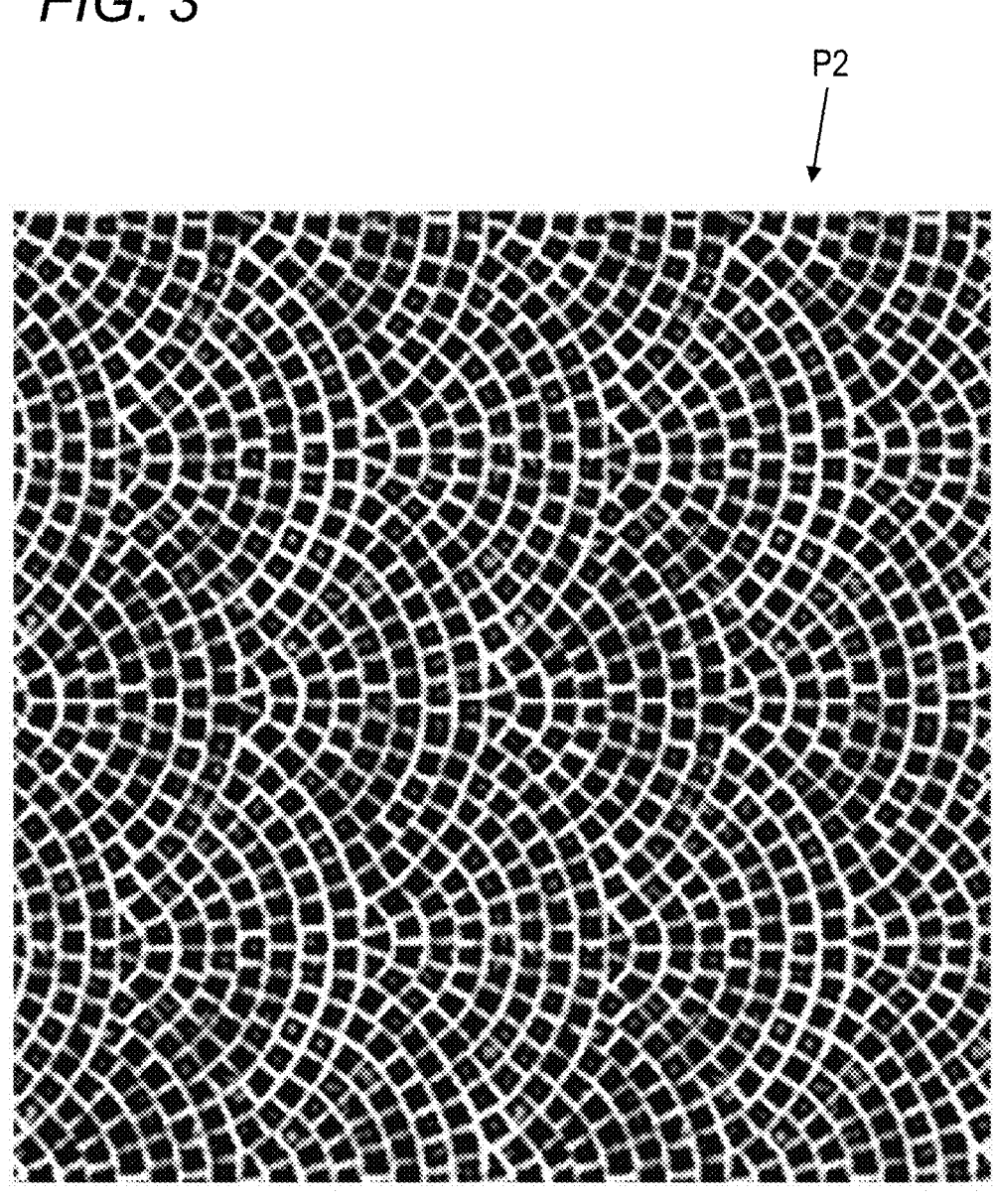
FIG. 3 is an example of an image processed in a gray-scaling step in the method for manufacturing a plate-shaped three-dimensional object according to the embodiment of the present disclosure.

In a gray-scaling step (step S20), the color image data prepared in the image preparation step (step S10) is gray-scaled to obtain grayscale image data. FIG. 3 shows grayscale image data P2 obtained by gray-scaling the color image data P1 in FIG. 2 prepared in the image preparation step (step S10). The grayscale image data P2 is gray-scaled in 256 gradations. As will be described later, the gradation of the grayscale image data P2 is set as the height from an upper surface of the plate-shaped three-dimensional object to be manufactured. The gray-scaling step (step S20) can be performed by the application software for performing photo processing provided in the PC.

The gray-scaling step (step S20) includes a brightness adjustment step of adjusting the brightness of an image (the color image data P1 and/or the grayscale image data P2). For example, if there is a portion where the height of the plate-shaped three-dimensional object to be manufactured is desired to be partially changed by, for example, viewing the grayscale image on a monitor of the PC, the height of the manufactured plate-shaped three-dimensional object can be partially changed by adjusting the brightness using the application software for performing photo processing. Alternatively, the overall height of a finish can also be adjusted by adjusting the brightness of the entire image.

Three-Dimensional Data Creation Step (Step S30)

Figure 4:
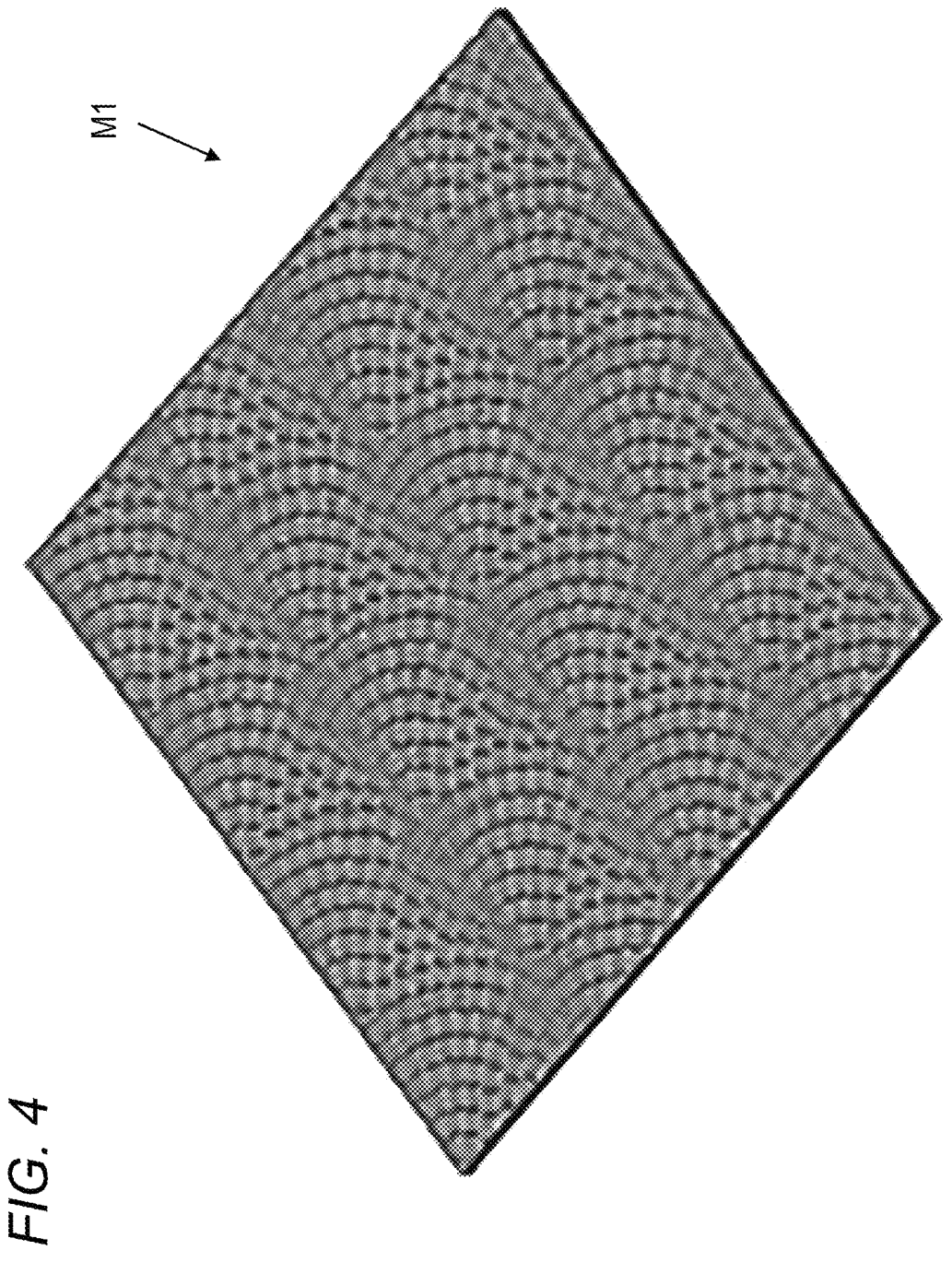
FIG. 4 is an example of three-dimensional data created in a three-dimensional data creation step in the method for manufacturing a plate-shaped three-dimensional object according to the embodiment of the present disclosure.

In a three-dimensional data creation step (step S30), three-dimensional data is created based on the gradation of the grayscale image data obtained in the gray-scaling step (step S20). The three-dimensional data creation step (step S30) can be performed by application software for creating three-dimensional data provided in the PC. FIG. 4 shows three-dimensional data M1 created in the three-dimensional data creation step (step S30) based on the grayscale image data P2 in FIG. 3.

In the three-dimensional data creation step (step S30), the height corresponding to the gradation of the grayscale image data is set in the application software for generating three-dimensional data. With an upper surface of the thickness of a base plate-shaped 3D model as a reference plane, the height can be set as a height from the reference plane. The height corresponds to the gradation of the grayscale image data. Alternatively, the height corresponding to the gradation of the grayscale image data may be set as the amount of depression from the upper surface of the thickness of the plate-shaped 3D model, that is, the height in a direction in which the thickness decreases.

If the grayscale image data P2 in FIG. 2 is 256 gradations, the height corresponding to the gradations can be set. The grayscale image data P2 is set such that the height is smaller as the color is closer to white and is larger as the color is closer to black. Another three-dimensional object may be modeled and added to a periphery of the created three-dimensional data M1.

Color Three-Dimensional Data Creation Step (Step S40)

Figure 5:
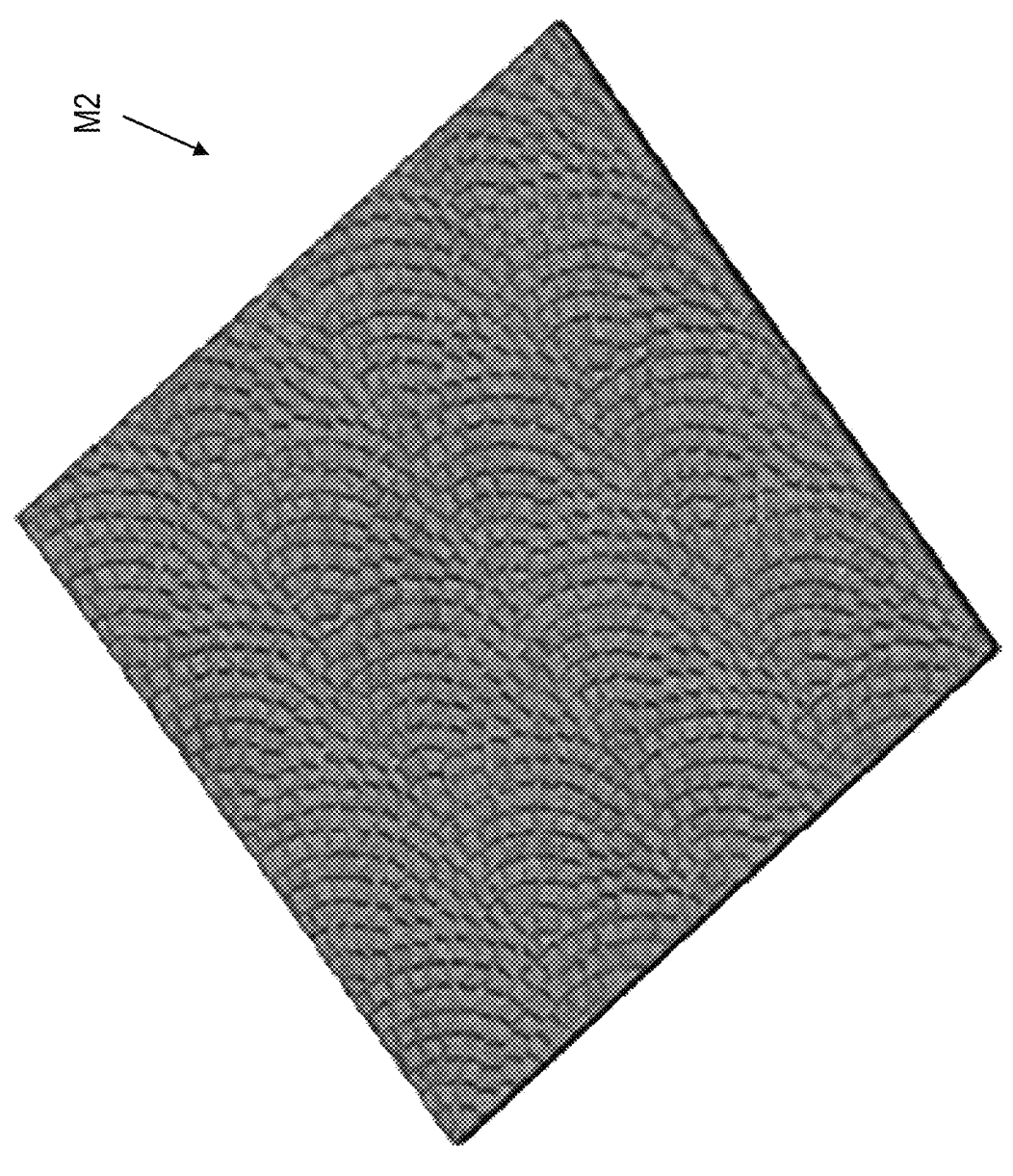
FIG. 5 is an example of color three-dimensional data created in a color three-dimensional data creation step in the method for manufacturing a plate-shaped three-dimensional object according to the embodiment of the present disclosure.

In a color three-dimensional data creation step (step S40), the color image data prepared in the image preparation step (step S10) is used as a texture, and texture mapping is performed on the three-dimensional data created in the three-dimensional data creation step (step S30) to create color three-dimensional data. FIG. 5 shows color three-dimensional data M2 created by performing texture mapping on the three-dimensional data M1 in FIG. 4 using the color image data P1 in FIG. 2 as a texture.

Since the size of the color image data P1 in FIG. 2 and the size of the three-dimensional data M1 are substantially the same, by using the color image data P1 shown in FIG. 2 prepared in the image preparation step (step S10) as a texture, the color image data P1 used as a texture can easily be pasted onto the three-dimensional data M1. In the color three-dimensional data M2 in FIG. 5, the color image data P1 whose entirety is a colored three-dimensional pattern is pasted onto the entirety of the three-dimensional data M1. However, for example, if the three-dimensional data M1 represents a three-dimensional object in which a colored three-dimensional pattern is provided only partially, texture mapping can also be performed partially using the color image data P1 as a texture (see FIG. 7 to be described later).

Shaping Step (Step S50)

In a shaping step (step S50), a plate-shaped three-dimensional object is shaped by a full color 3D printer (not shown) based on the color three-dimensional data created in the color three-dimensional data creation step (step S40). As a full color 3D printer, a UV curing inkjet full color 3D printer can be used.

Figure 6:
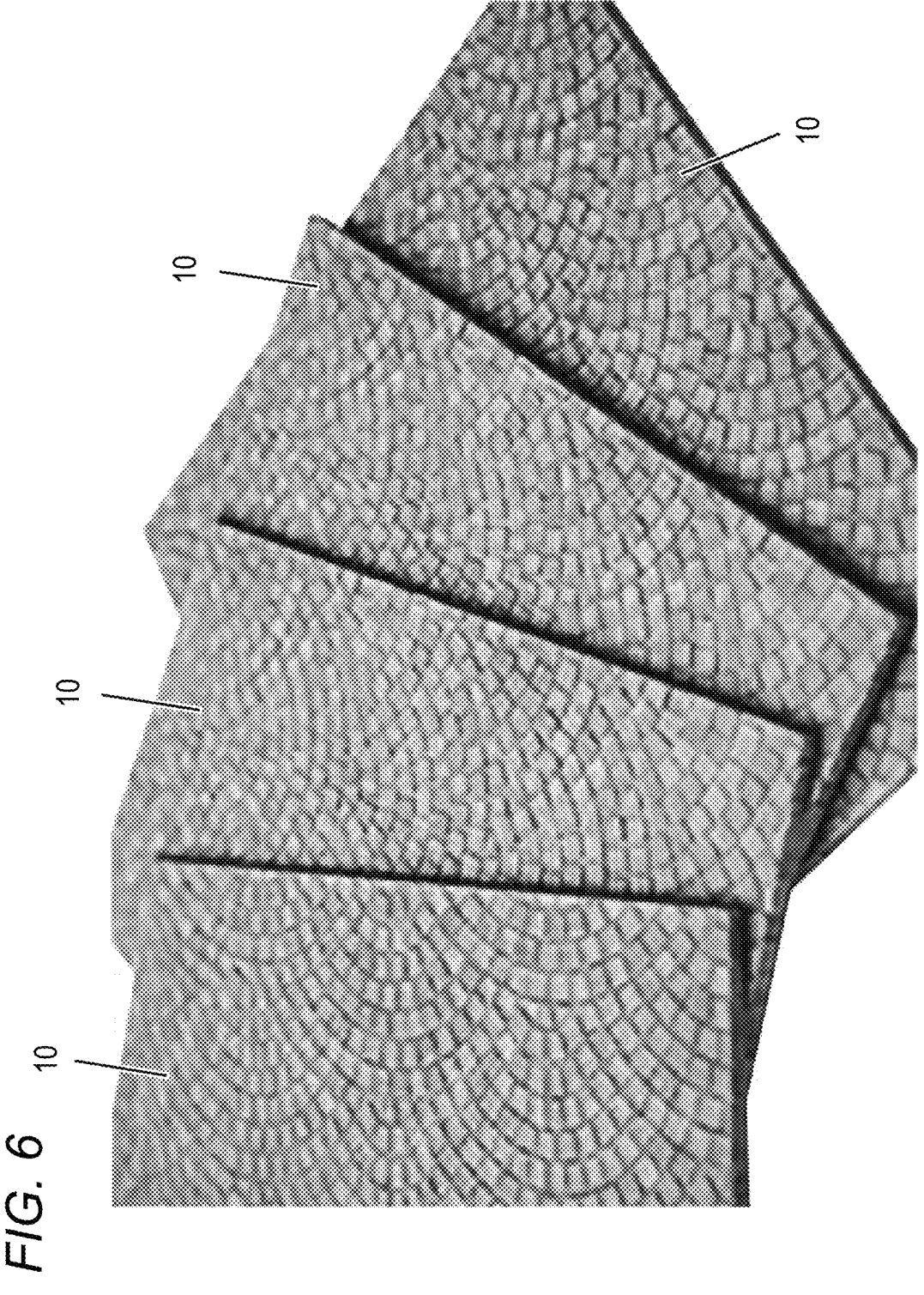
FIG. 6 is an example of a plate-shaped three-dimensional object manufactured by the method for manufacturing a plate-shaped three-dimensional object according to the embodiment of the present disclosure.

In this example in which an image of a stone road is captured and the color image data P1 in FIG. 2 is used, a plate-shaped three-dimensional object 10 shown in FIG. 6 can be manufactured by the full color 3D printer based on the color three-dimensional data M2 in FIG. 5. A plurality of the plate-shaped three-dimensional objects 10 manufactured by the full color 3D printer can be easily manufactured.

Figure 7:
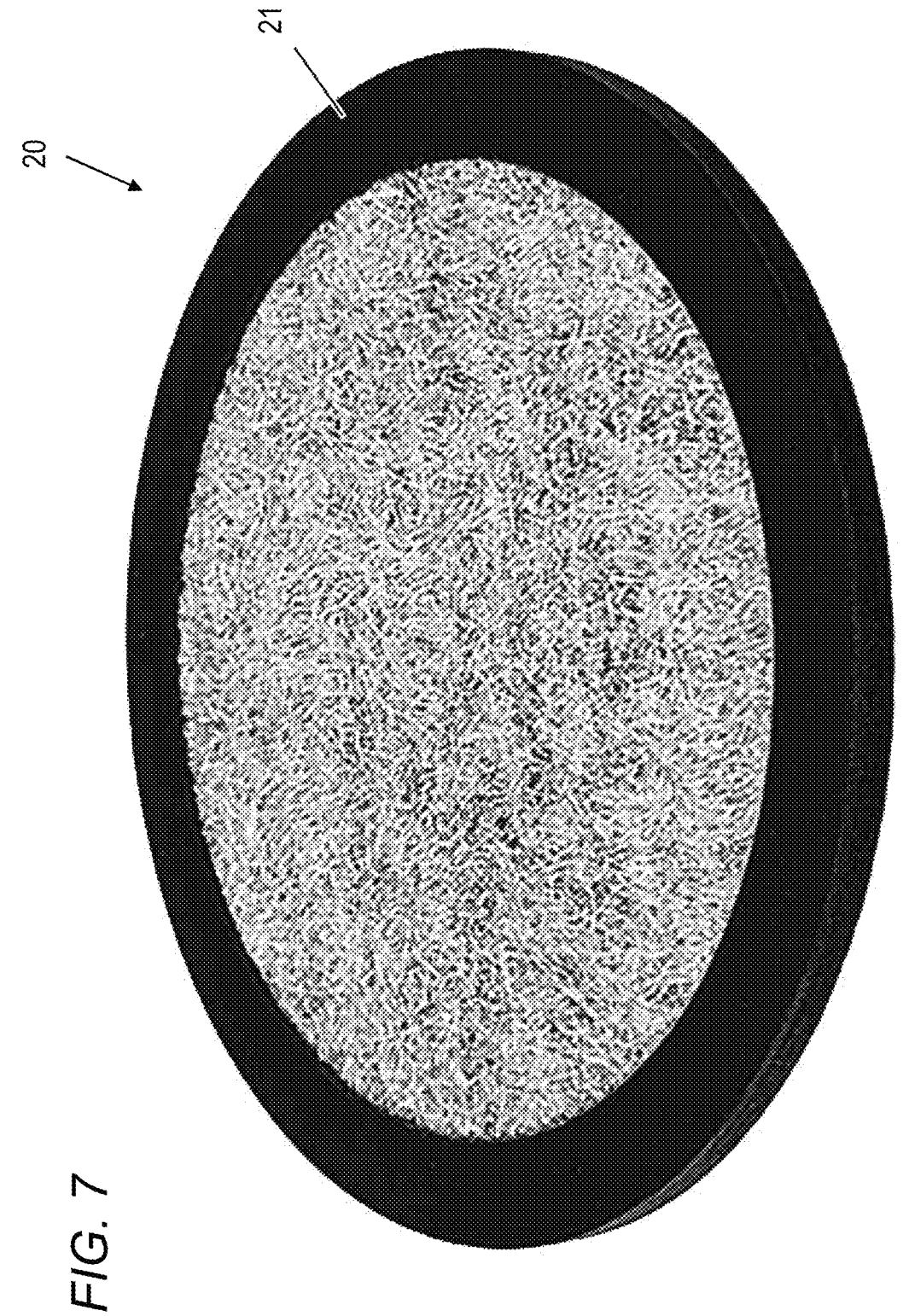
FIG. 7 is a photographic view showing another example of the plate-shaped three-dimensional object manufactured by the method for manufacturing a plate-shaped three-dimensional object according to the embodiment of the present disclosure.

As another example of the plate-shaped three-dimensional object, as shown in FIG. 7, it is possible to manufacture a plate-shaped three-dimensional object 20 in which a colored three-dimensional pattern with a lawn as a motif is formed inside an annular ring 21. The ring 21 can be modeled in the three-dimensional data creation step (step S30) or the color three-dimensional data creation step (step S40).

In the manufacture of the plate-shaped three-dimensional object 20, it is preferable to cut out a captured image of the lawn into a circular shape in the image preparation step (step S10). In the color three-dimensional data creation step (step S40), texture mapping is performed only inside a 3D model of the ring 21 using the color image data created in the image preparation step (step S10) as a texture. Accordingly, color three-dimensional data can be created (the color three-dimensional data creation step (step S40)).

Figure 8:
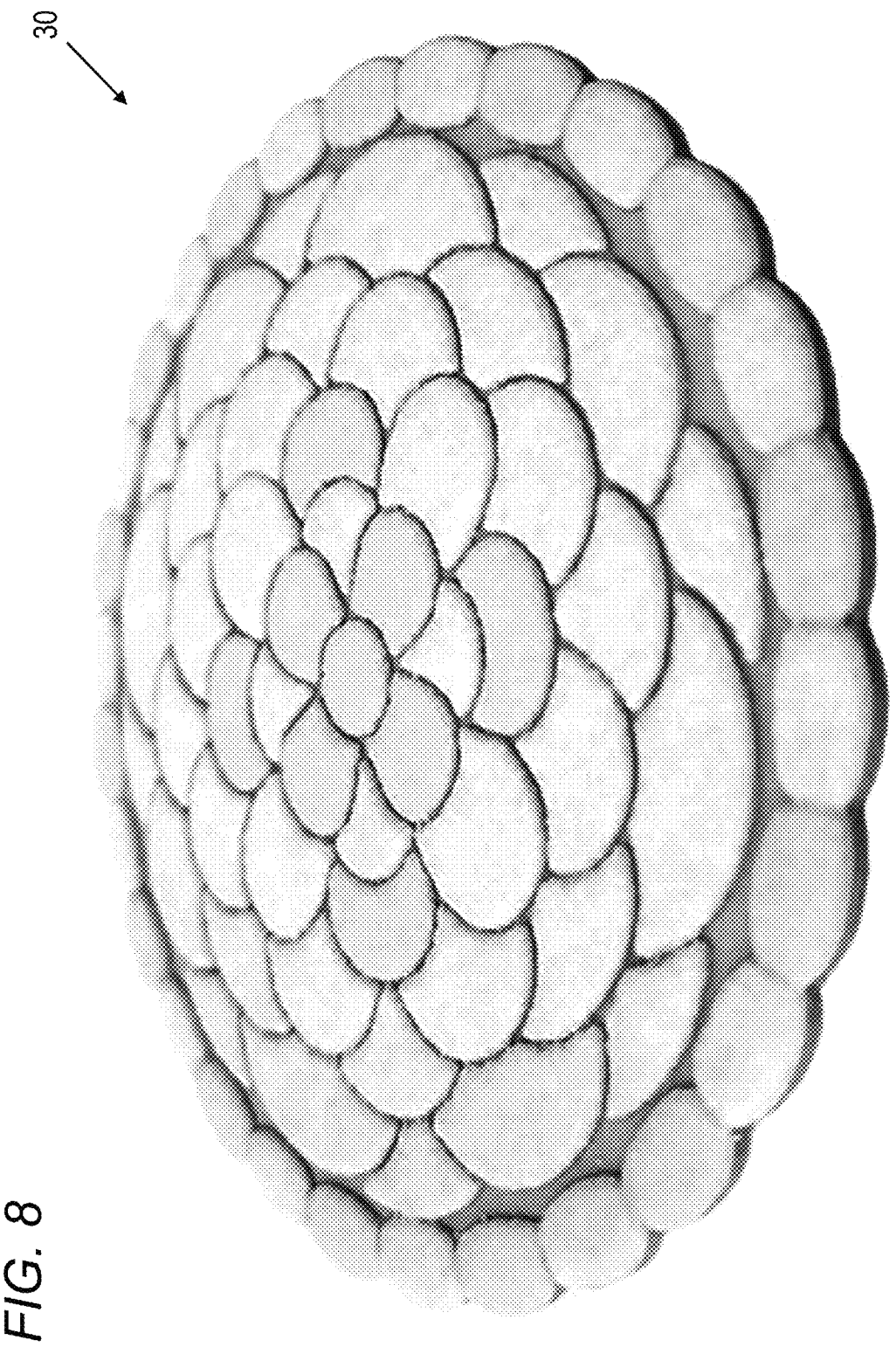
FIG. 8 is a photographic view showing another example of the plate-shaped three-dimensional object manufactured by the method for manufacturing a plate-shaped three-dimensional object according to the embodiment of the present disclosure.

As yet another example of the plate-shaped three-dimensional object, as shown in FIG. 8, in the image preparation step (step S10), color image data of the colored three-dimensional pattern created by drawing software or the like can be created, and a plate-shaped three-dimensional object 30 can be manufactured based on the color image data.

According to the embodiment of the present disclosure described above, it is possible to provide a method for manufacturing a plate-shaped three-dimensional object according to the following aspects.

A method for manufacturing a plate-shaped three-dimensional object (10, 20, 30) according to a first aspect includes: an image preparation step (S10) of preparing color image data (P1) including a colored three-dimensional pattern; a gray-scaling step (S20) of gray-scaling the color image data (P1) prepared in the image preparation step (S10) to obtain a grayscale image data (P2); a three-dimensional data creation step (S30) of creating three-dimensional data (M1) based on a gradation of the grayscale image data (P2) obtained in the gray-scaling step (S20); a color three-dimensional data creation step (S40) of creating color three-dimensional data (M2) by performing texture mapping on the three-dimensional data (M1) created in the three-dimensional data creation step (S30) using the color image data (P1) prepared in the image preparation step (S10) as a texture; and a shaping step (S50) of shaping the plate-shaped three-dimensional object (10, 20, 30) by a full color 3D printer based on the color three-dimensional data (M2) created in the color three-dimensional data creation step (S40).

According to this configuration, it is possible to easily create three-dimensional data even for a shape having fine continuous patterns such as a lawn or a stone. Further, since the original color image data is pasted as a texture onto the three-dimensional data, it is possible to easily color the three-dimensional data. In particular, like a lawn or a stone, the three-dimensional data is given a shade that is not uniform (a single color), and the plate-shaped three-dimensional object is shaped by the full color 3D printer. Therefore, it is possible to manufacture a plate-shaped three-dimensional object such as a diorama base that resembles a real lawn or stone.

In the method for manufacturing the plate-shaped three-dimensional object (10, 20, 30) according to a second aspect, the gray-scaling step (S20) includes a brightness adjustment step of adjusting brightness of at least one of the color image data (P1) and the grayscale image data (P2).

According to this configuration, the height of the colored three-dimensional pattern of the plate-shaped three-dimensional object to be manufactured can be easily changed and adjusted using the application software for general photo processing.

In the method for manufacturing the plate-shaped three-dimensional object (10, 20, 30) according to a third aspect, the image preparation step (S10) includes: an image capturing step of obtaining a photo data prepared by capturing an image of a patterned floor surface; and a photo cutting step of obtaining the color image data (P1) by cutting the photo data obtained in the image capturing step into a rectangular shape so as to form continuous patterns when arranged in at least one of a vertical direction and a horizontal direction.

According to this configuration, even in the case of a diorama base having a colored three-dimensional pattern and requiring a large area, by manufacturing the same type of plate-shaped three-dimensional objects, the patterns can be arranged in a manner of being continuous to form the diorama base.

The embodiment of the present disclosure has been described above. However, the present disclosure is not limited to the present embodiment, and various modifications may be made.

What is claimed is:

1. A method for manufacturing a plate-shaped three-dimensional object, the method comprising:
   preparing color image data including a colored three-dimensional pattern;
   gray-scaling the color image data to obtain a grayscale image data;
   creating three-dimensional data based on a gradation of the grayscale image data;
   creating color three-dimensional data by performing texture mapping on the three-dimensional data using the color image data as a texture; and
   shaping the plate-shaped three-dimensional object by a full color 3D printer based on the color three-dimensional data.

2. The method for manufacturing the plate-shaped three-dimensional object according to claim 1, further comprising:
   adjusting brightness of at least one of the color image data and the grayscale image data.

3. The method for manufacturing the plate-shaped three-dimensional object according to claim 1,
   wherein the preparing the color image data comprises:
      obtaining a photo data prepared by capturing an image of a patterned floor surface; and
      obtaining the color image data by cutting the photo data into a rectangular shape so as to form continuous patterns when arranged in at least one of a vertical direction and a horizontal direction.

* * * * *